United States Patent
Nickel et al.

(10) Patent No.: US 12,524,931 B2
(45) Date of Patent: Jan. 13, 2026

(54) ADJUSTED DATA CONSISTENCY IN DEEP LEARNING RECONSTRUCTIONS

(71) Applicant: Siemens Healthineers AG, Forchheim (DE)

(72) Inventors: Marcel Dominik Nickel, Herzogenaurach (DE); Thomas Benkert, Neunkirchen am Brand (DE); Simon Arberet, Princeton, NJ (US); Mahmoud Mostapha, Princeton, NJ (US); Mariappan S. Nadar, Plainsboro, NJ (US)

(73) Assignee: Siemens Healthineers AG, Forchheim (DE)

( * ) Notice: Subject to any disclaimer, the term of this patent is extended or adjusted under 35 U.S.C. 154(b) by 678 days.

(21) Appl. No.: 17/813,334

(22) Filed: Jul. 19, 2022

(65) Prior Publication Data

US 2024/0029323 A1    Jan. 25, 2024

(51) Int. Cl.
| | | |
|---|---|---|
| *G06N 3/044* | (2023.01) | |
| *A61B 5/00* | (2006.01) | |
| *A61B 5/055* | (2006.01) | |
| *G06N 3/084* | (2023.01) | |
| *G06T 5/70* | (2024.01) | |
| *G06T 11/00* | (2006.01) | |

(52) U.S. Cl.
CPC .......... *G06T 11/005* (2013.01); *A61B 5/055* (2013.01); *A61B 5/7203* (2013.01); *A61B 5/7267* (2013.01); *A61B 5/742* (2013.01); *G06T 5/70* (2024.01); *G06T 2207/10088* (2013.01); *G06T 2207/20081* (2013.01); *G06T 2210/41* (2013.01); *G06T 2211/424* (2013.01)

(58) Field of Classification Search
USPC ........ 128/897–899, 920, 922–925; 382/128–132, 154–159, 276–299; 706/1–62, 900–903, 924
See application file for complete search history.

(56) References Cited

U.S. PATENT DOCUMENTS

| | | | |
|---|---|---|---|
| 2015/0049930 A1* | 2/2015 | Brown | G06T 11/005 382/131 |
| 2016/0054420 A1* | 2/2016 | Wong | G01R 33/56341 324/309 |
| 2019/0142357 A1* | 5/2019 | Fan | A61B 6/542 600/425 |
| 2019/0172230 A1* | 6/2019 | Mailhe | G06N 3/084 |
| 2019/0325619 A1* | 10/2019 | Zhang | G06T 11/008 |
| 2020/0005497 A1* | 1/2020 | Arberet | G06T 11/006 |
| 2020/0105032 A1* | 4/2020 | Yang | G06T 5/70 |
| 2020/0300957 A1* | 9/2020 | Chen | G01R 33/5608 |

(Continued)

OTHER PUBLICATIONS

Pruessmann, Klaas P., et al. "SENSE: sensitivity encoding for fast MRI." Magnetic Resonance in Medicine: An Official Journal of the International Society for Magnetic Resonance in Medicine 42.5 (1999): 952-962.

(Continued)

*Primary Examiner* — Marcellus J Augustin

(57) ABSTRACT

Systems and methods for reconstruction for a medical imaging system. A scaling factor is used during the reconstruction process to adjust a step size of a gradient update. The adjustment of the step size of the gradient provides the ability to adjust a level of denoising by the reconstruction process.

17 Claims, 5 Drawing Sheets

(56) References Cited

U.S. PATENT DOCUMENTS

2021/0035338 A1\* 2/2021 Zhou ................. G06T 11/006
2022/0148130 A1\* 5/2022 Tang ................. G06T 3/4053
2022/0180574 A1 6/2022 Mailhe et al.

OTHER PUBLICATIONS

Clifford, Bryan, et al. "An artificial intelligence-accelerated 2-minute multi-shot echo planar imaging protocol for comprehensive high-quality clinical brain imaging." Magnetic Resonance in Medicine 87.5 (2022): 2453-2463.

\* cited by examiner

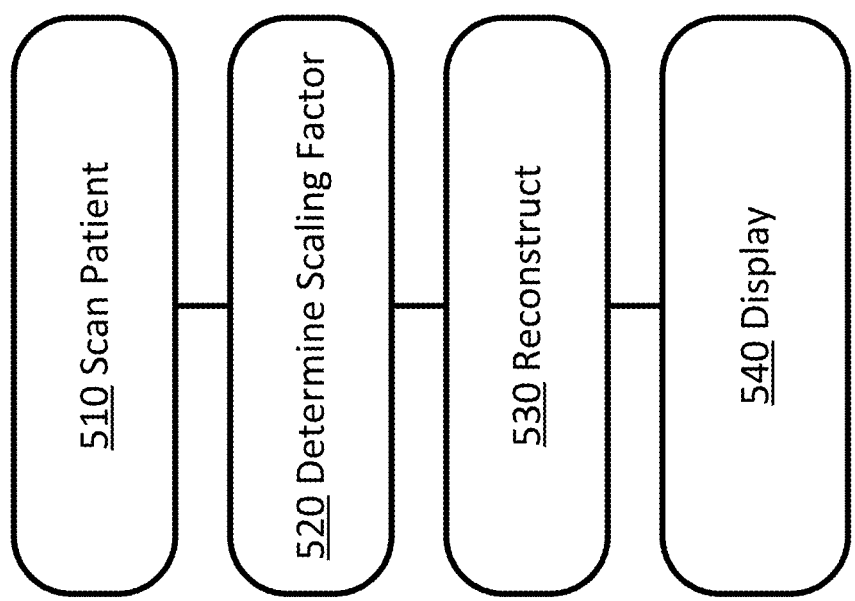

ADJUSTED DATA CONSISTENCY IN DEEP LEARNING RECONSTRUCTIONS

FIELD

This disclosure relates to medical image reconstruction, such as reconstruction in magnetic resonance (MR) imaging.

BACKGROUND

Some types of medical imaging perform reconstruction for imaging, such as MR, computed tomography (CT), positron emission tomography (PET), or single photon emission computed tomography (SPECT). With conventional reconstruction methods, the speed of an acquisition can only be achieved by accepting compromises with respect to image resolution or signal-to-noise ratio (SNR). In general, acquisition speed, image resolution, and SNR are tightly linked and increasing one of the three has a negative effect on at least one of the two others. The use of receive arrays and parallel imaging has been an important breakthrough in MR image reconstruction and is an essential part of clinical routine in MRI. Parallel imaging, however, usually comes at the price of higher image noise, especially in regions further away from the receive coils. This results in inhomogeneous noise distribution, especially if high acceleration factors are used. The use of deep neural networks has proven to be helpful when trying to address these limitations of conventional MR image reconstruction, especially for routine two-dimensional imaging. Deep learning image reconstruction has the potential to tackle all three limiting factors of MR imaging simultaneously: image resolution, SNR, and acquisition speed.

Deep learning methods can generate high quality images. As an example, by including raw data in the reconstruction process, clinically robust results are achieved that outperform classical denoising and interpolation. Despite these recent successes of machine-learned accelerated MR reconstruction models, there is no consensus on an optimal image impression such as noise level, perceived sharpness, etc. The desired image (e.g., level of noise versus sharpness) typically varies depending on the radiologist preference and the targeted application. Targeted and/or varied denoising methods may provide different levels and options for operators.

One method for variable denoising requires using an additional denoising module at the end of the reconstruction. However, this type of post-processing step slows down the process and requires additional training of the reconstruction process. In another option, multiple networks are trained for different applications and denoising strengths. This requires redundant training and potentially additional training data and is thus inefficient and slow. An iterative reconstruction may be used that is performed after the deep-learning inference in order to adjust the level of denoising. However, this method has drawbacks as it removes many of the benefits of a fast deep learning reconstruction.

SUMMARY

By way of introduction, the preferred embodiments described below include methods, systems, instructions, and computer readable media for reconstruction in medical imaging. A tunable parameter, for example a gradient scaling factor is used to adjust denoising of a reconstructed medical image.

In a first aspect, a method of reconstruction for a medical imaging system is provided. The method includes: scanning a patient by the medical imaging system, the scanning acquiring scan data; determining a scaling factor to vary denoising behavior for a trained reconstruction network, wherein the scaling factor relates to a gradient update parameter; reconstructing, by the trained reconstruction network using the scaling factor, an object of the patient from the scan data; and displaying an image of the reconstructed object.

In an embodiment, scanning comprises magnetic resonance scanning pursuant to a protocol for data acquisition with regular or irregular undersampling.

The scaling factor may adjust a gradient step size of the trained reconstruction network. The scaling factor may be determined based on a sampling pattern or on a level of noise in the scan data. The scaling factor may be determined by a machine learnt network trained using inputs including at least one of an ipat factor, a phase resolution, a phase oversampling, a noise std, a partial Fourier factor, or a b-value, wherein the machine learnt network is trained end to end with the reconstruction network. Additionally, or alternatively, determining the scaling factor comprises receiving a desired denoising level from an operator; wherein the scaling factor is determined from the desired denoising level.

In an embodiment, reconstructing comprises reconstructing with an unrolled iterative reconstruction. Reconstructing may include an alternation between a data consistency step and a regularization step; wherein the scaling factor is applied in each data consistency step. The reconstruction network is trained prior to scanning the patient and the parameters of the reconstruction network are fixed during training.

In a second aspect a medical imaging system is provided for reconstruction. The medical imaging system includes a medical scanner, an input, an image processor, and a display. The medical scanner is configured to scan a region of a patient, the scan providing scan data. The input is configured to receive a scaling factor. The image processor is configured to reconstruct a representation of the region of the patient using a trained reconstruction network that is adjusted with the scaling factor. The display is configured to display an image of the region based on the representation. The medical scanner may comprise a magnetic resonance scanner.

In an embodiment, the scaling factor adjusts a gradient step size of the trained reconstruction network. The scaling factor may be based on a sampling pattern for the scan or based on a level of noise in the scan data. The scaling factor may be determined by a machine learnt network trained using one or more parameters from the scan, wherein the machine learnt network is trained end to end with the reconstruction network.

The image processor may be configured to reconstruct the representation using an unrolled iterative reconstruction that comprises an alternation between a data consistency step and a regularization step; wherein the scaling factor is applied in each data consistency step.

In a third aspect, a non-transitory computer readable storage medium is provided comprising a set of computer-readable instructions stored thereon which, when executed by at least one processor cause the processor to: acquire scan data from a medical imaging scan; determine a scaling factor for adjusting a gradient step size for a trained reconstruction algorithm; adjust the trained reconstruction algorithm using the scaling factor; generate an image from the scan data using the adjusted trained reconstruction algorithm; and display the image.

The scaling factor may be determined based on a sampling pattern for the medical imaging scan or based on a level of noise in the scan data.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

FIG. 5 depicts an example of a workflow for reconstruction of a medical image according to an embodiment.

DETAILED DESCRIPTION

Figure 1:
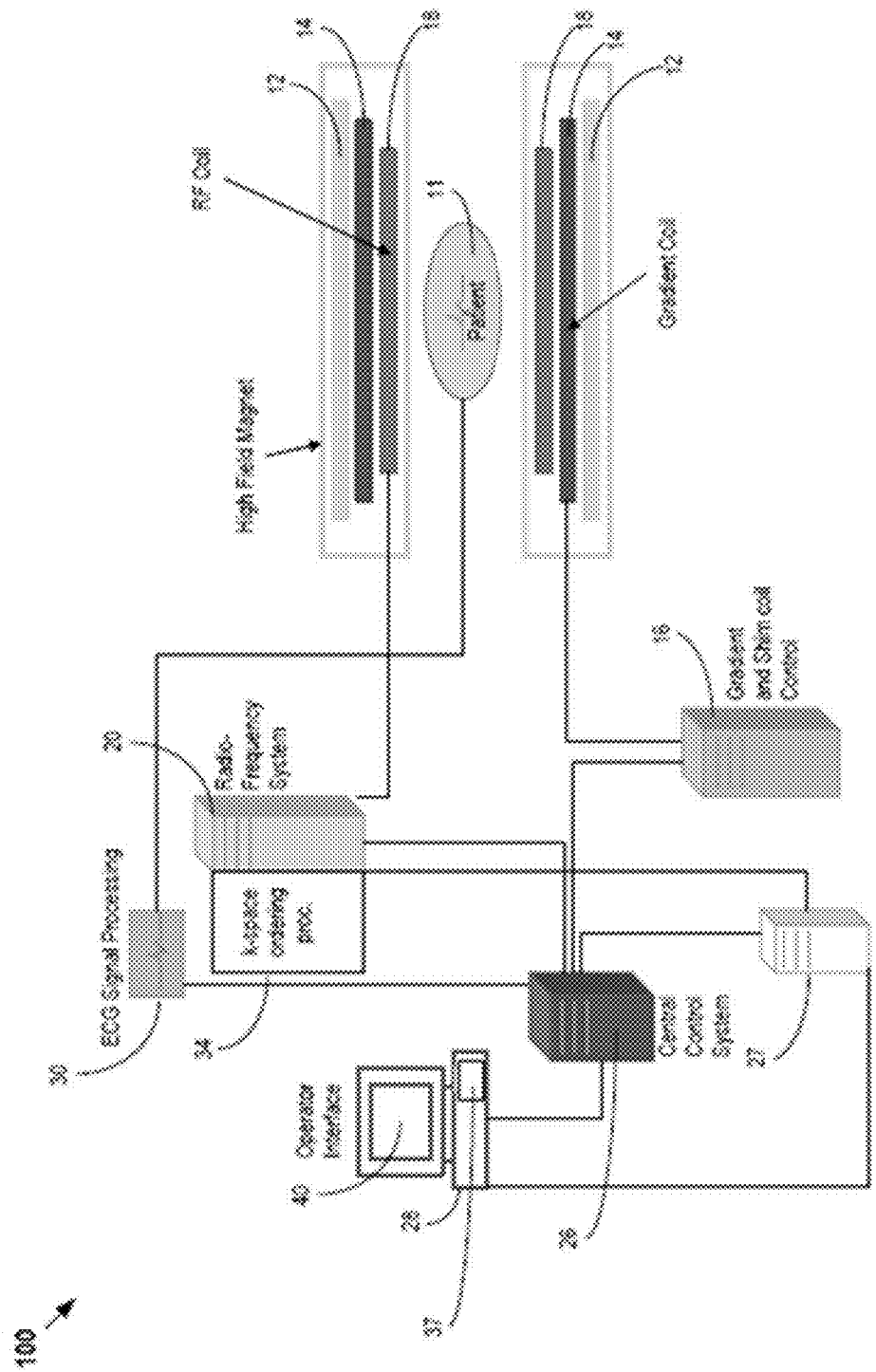
FIG. 1 depicts an example system for reconstruction of a medical image according to an embodiment.

Current deep learning (DL) MRI reconstruction may be formulated as a trainable unrolled optimization framework including several cascades of DL regularization networks and varying data consistency layers. The amount of alternation, in particular the step size of the data consistency term, is typically fixed in the training. The amount of alternation between data consistency term and regularization defines the denoising behavior (e.g.: increased regularization leads to increased denoising). Consequently, the obtained reconstruction networks have a fixed denoising behavior that also depends on the training dataset.

Furthermore, depending on details of the implementation, the denoising behavior may change with the extent of the images. In particular, the step-size of the data consistency may scale due to the convention of the Fourier transformation. Additionally, the denoising behavior for different acceleration factors of the under sampling—even in the case of similar aliasing—may change. As an example, less denoising is observed at smaller acceleration factors. The networks in the unrolled optimization framework also do not explicitly use information of the thermal noise in the training process. As such, the generalization to applications with differing SNR may be limited. As described above, in certain systems, the modification of the denoising strengths may be performed by an additional denoising module at the end of the unrolled reconstruction. Alternatively, multiple networks may be trained for different applications and denoising strengths.

In another example of an attempt to provide variable denoising, an iterative reconstruction is performed after the deep-learning inference in order to adjust the level of denoising. The first limitation of this approach is that running an iterative reconstruction will remove the benefit of having a fast deep learning reconstruction. Second in addition to tuning a lambda parameter to adjust the level of denoising, this process also needs to adjust a weighted diagonal matrix to keep the balance of the data-consistency term with the regularization term when the ipat factor is changed. As such, this solution does not generalize well to the different ipat factors and even less to an arbitrary sampling pattern because their requirement is that this matrix should have the same number of non-zero entries as the sampling mask to keep the balance but also have a support complimentary to the one of the mask.

Embodiments described herein provide systems and methods for MR reconstruction with an adjustable gradient scaling factor for a data consistency term. The gradient scaling factor is applied to an already trained network in order to adjust the level of denoising. Embodiments thus provide denoising of already trained unrolled networks and an insertion of noise level into neural networks for better generalization. In addition, better generalization of the network is provided by using multiple sampling patterns and particularly multiple acceleration factors. Further, embodiments provide a reduction in training time with more consistent normalization of different training samples at the input of a regularization network.

FIG. 1 depicts an embodiment of a system for reconstruction in medical imaging. The system scans a given patient and then reconstructs a representation of the patient from the scan. A scaling factor is provided by an operator (or determined based on the scan properties or other inputs). The scaling factor is used during the reconstruction process to adjust, for example, a step size of a gradient for a data consistency term. The step size of the gradient influences the denoising process thus providing variable denoising. The system outputs a representation of a region or portion of the given patient. The system is described below in general, with a following method providing other details. The system implements the method of FIG. 3, the unrolled network of FIG. 2, or other instructions.

The example used herein is in a MR context (i.e., a MR scanner), but other types of scanners may be used (e.g., reconstruction for CT, PET, SPECT, or other medical imaging). The system is implemented by an MR scanner or system, a computer based on data obtained by MR scanning, a server, or another processor. MR scanning system 100 is only exemplary, and a variety of MR scanning systems can be used to collect the MR data. The MR scanner 100 is configured to scan a patient. The scan provides scan data in a scan domain. The system 100 scans a patient to provide k-space measurements (measurements in the frequency domain).

In the system 100, magnetic coils 12 create a static base magnetic field in the body of patient 11 to be positioned on a table and imaged. Within the magnet system are gradient coils 14 for producing position dependent magnetic field gradients superimposed on the static magnetic field. Gradient coils 14, in response to gradient signals supplied thereto by a gradient and shim coil control module 16, produce position dependent and shimmed magnetic field gradients in three orthogonal directions and generate magnetic field pulse sequences.

RF (radio frequency) module 20 provides RF pulse signals to RF coil 18, which in response produces magnetic field pulses that rotate the spins of the protons in the imaged body of the patient 11 by ninety degrees, by one hundred and eighty degrees for so-called "spin echo" imaging, or by angles less than or equal to 90 degrees for so-called "gradient echo" imaging. Gradient and shim coil control module 16 in conjunction with RF module 20, as directed by central control unit 26, control slice-selection, phase-encoding, readout gradient magnetic fields, radio frequency transmission, and magnetic resonance signal detection, to acquire magnetic resonance signals representing planar slices of patient 11.

In response to applied RF pulse signals, the RF coil 18 receives MR signals, i.e., signals from the excited protons within the body as they return to an equilibrium position established by the static and gradient magnetic fields. The RF coil 18 may be a whole-body coil or may be formed from one or more local coils, at least on receive. The MR signals are detected and processed by a detector within RF module 20 and k-space component processor unit 34 to provide an MR dataset to an image data processor for processing into an image (i.e., for reconstruction in the object domain from the k-space data in the scan domain). In some embodiments, the image processor is in or is the central control unit 26. In other embodiments, such as the one depicted in FIG. 1, the image processor is in a separate unit 27. ECG synchronization signal generator 30 provides ECG signals used for pulse sequence and imaging synchronization. A two- or three-dimensional k-space storage array of individual data elements in k-space component processor unit 34 stores corresponding individual frequency components forming an MR dataset. The k-space array of individual data elements has a designated center, and individual data elements individually have a radius to the designated center.

A magnetic field generator (comprising coils 12, 14 and 18) generates a magnetic field for use in acquiring multiple individual frequency components corresponding to individual data elements in the storage array. A storage processor in the k-space component processor unit 34 stores individual frequency components acquired using the magnetic field in corresponding individual data elements in the array. The row and/or column of corresponding individual data elements alternately increases and decreases as multiple sequential individual frequency components are acquired. The magnetic field acquires individual frequency components in an order corresponding to a sequence of substantially adjacent individual data elements in the array, and magnetic field gradient change between successively acquired frequency components is substantially minimized.

The central control unit 26 uses information stored in an internal database to process the detected MR signals in a coordinated manner to generate high quality images of a selected slice(s) of the body (e.g., using the image data processor) and adjusts other parameters of the system 100. The stored information includes a predetermined pulse sequence of an imaging protocol and a magnetic field gradient and strength data as well as data indicating timing, orientation, and spatial volume of gradient magnetic fields to be applied in imaging.

The medical scanner 100 is configured by the imaging protocol to scan a region of a patient 11. For example, in MR, such protocols for scanning a patient for a given examination or appointment include diffusion-weighted imaging (acquisition of multiple b-values, averages, and/or diffusion directions), turbo-spin-echo imaging (acquisition of multiple averages), or contrast. In one embodiment, the protocol is for compressed sensing. The k-space is under sampled for more rapid scanning of the patient. The reconstruction may still reconstruct a representation in the object domain from the under sampled k-space data, but the representation may be more likely to suffer from noise. In another embodiment, parallel imaging is used. Multiple local coils are used to receive the data, providing additional information for reconstruction. In yet another embodiment, the protocol is pursuant to a protocol for data acquisition with regular or irregular undersampling.

The system 100 includes an operator interface 40, formed by an input and an output. The input may be an interface, such as interfacing with a computer network, memory, database, medical image storage, or other source of input data. The input may be a user input device, such as a mouse, trackpad, keyboard, roller ball, touch pad, touch screen, or another apparatus for receiving user input. The input receives the level of characteristic, such as a denoising level. An individual may input the level, such as manually or physically entering the level. Previously used levels may be input from the interface. Default, institution, facility, or group set levels may be input, such as from memory to the interface.

The output is a display device but may be an interface. The final and/or intermediate images reconstructed from the scan are displayed. For example, an image of a region of the patient tuned is displayed. A generated image of the reconstructed representation for a given patient is presented on a display of the operator interface 40.

The display is a CRT, LCD, plasma, projector, printer, or other display device. The display is configured by loading an image to a display plane or buffer. The display is configured to display the reconstructed MR image of the region of the patient. The computer 28 of the operator interface forms a graphical user interface (GUI) enabling user interaction with the central control unit 26 and enables user modification in substantially real time. The display processor 37 processes the magnetic resonance signals to provide image representative data for display on a display device, for example.

The central control unit 26 (i.e., controller) and/or processor 27 is an image processor that reconstructs a representation of the patient from the k-space data. The image processor is a general processor, digital signal processor, three-dimensional data processor, graphics processing unit, application specific integrated circuit, field programmable gate array, artificial intelligence processor, digital circuit, analog circuit, combinations thereof, or another now known or later developed device for reconstruction. The image processor is a single device, a plurality of devices, or a network. For more than one device, parallel or sequential division of processing may be used. Different devices making up the image processor may perform different functions, such as reconstructing by one device and volume rendering by another device. In one embodiment, the image processor is a control processor or other processor of the MR scanner 100. Other image processors of the MR scanner 100 or external to the MR scanner 100 may be used. The image processor is configured by software, firmware, and/or hardware to reconstruct. The instructions for implementing the processes, methods, and/or techniques discussed herein are provided on non-transitory computer-readable storage media or memories, such as a cache, buffer, RAM, removable media, hard drive, or other computer readable storage media. The instructions are executable by the processor or another processor. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the instructions set, storage media, processor or processing strategy and may be performed by software, hardware, integrated circuits, firmware, micro code, and the like, operating alone or in combination. In one embodiment, the instructions are stored on a removable media device for reading by local or remote systems. In other embodiments, the instructions are stored in a remote location for transfer through a computer network. In yet other embodiments, the instructions are stored within a given computer, CPU, GPU, or system. Because some of the constituent system components and method steps depicted in the accompanying figures may be implemented in software, the actual connections between the system components (or the process steps)

may differ depending upon the manner in which the present embodiments are programmed.

The image processor is configured to reconstruct a representation of a scan region, such as a region of the patient. The image processor is configured to reconstruct a representation in an object domain. The representation or object in the object domain is reconstructed from the scan data in the scan domain. The scan data is a set or frame of k-space data from a scan of the patient. The object domain is an image space and corresponds to the spatial distribution of the patient. A planar or volume representation or object is reconstructed as an image representing the patient. For example, pixels values representing tissue in an area or voxel values representing tissue distributed in a volume are generated.

The system 100 performs reconstruction. The reconstruction may be a traditional approach or optimization (e.g., not machine-learning based), such as generalized auto calibrating partially parallel acquisitions (GRAPPA). In other embodiments, the reconstruction is performed, at least in part, using a machine-learned model or algorithm. The machine-learned model is formed from one or more networks and/or other machine-learned arrangements (e.g., support vector machine). For an example used herein, the machine-learned model includes one or more deep-learned neural networks included in an unrolled iterative reconstruction algorithm. A machine-learned model is used for at least part of the reconstruction, such as regularization of reconstruction. In regularization, image or object domain data is input, and image or object domain data with less artifact is output. The remaining portions or stages of the reconstruction (e.g., Fourier transform and gradients in iterative optimization) are performed using reconstruction algorithms and/or other machine-learned networks. In other embodiments, a machine-learned model is used for all the reconstruction operations (one model to input k-space data and output regularized image data) or other reconstruction operations (e.g., used for transform, gradient operation, and/or regularization). The reconstruction is of an object or image domain from projections or measurements in another domain, and the machine-learned model is used for at least part of the reconstruction.

In embodiments, an unrolled iterative reconstruction is provided that alternates gradient updates and regularization where a machine-learned network is provided for regularization through iteration sequences. Each given iteration either in an unrolled network or through a repetition of the reconstruction operations includes a gradient update and regularization. The gradient update compares the current image object with the scan data (e.g., k-space measurements). This comparison uses a system transform to relate the measurements to the image object. A gradient or comparison relating the image object to the measurements may be used. The gradient update uses a scaling factor that is determined based on scan settings or operator input. The scaling factor may relate to a gradient step size. In an embodiment, the scaling factor is determined based on a sampling pattern. In another embodiment, the scaling factor is determined based on a level of noise in the scan data. Regularization is provided in one, some, or all the iterations and can include the application of a machine learned network, for example a convolutional neural network (CNN).

Figure 2:
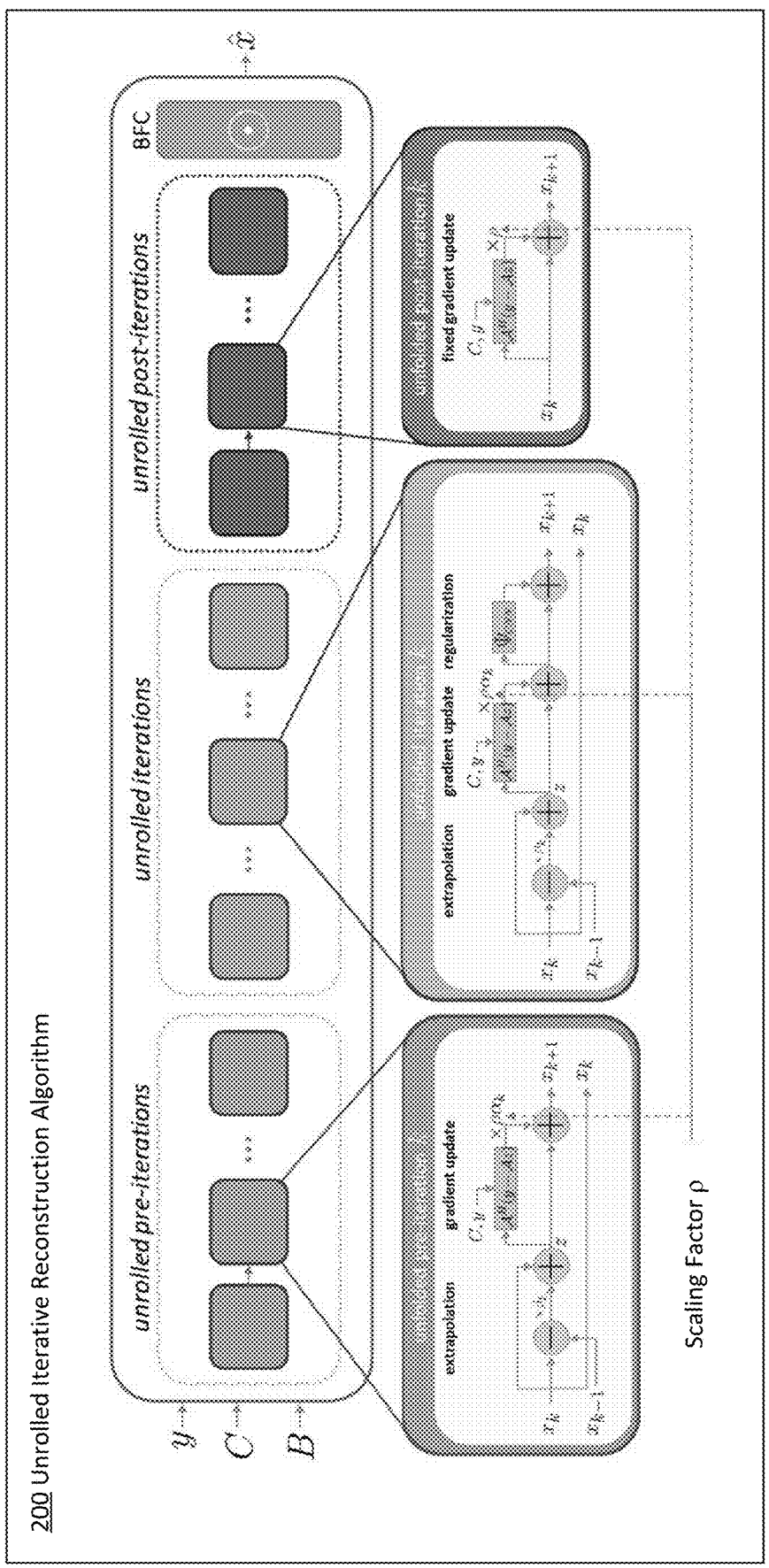
FIG. 2 depicts an unrolled reconstruction algorithm according to an embodiment.

FIG. 2 depicts an example of an unrolled iterative reconstruction algorithm 200. The reconstruction includes unrolled iterations (unrolled pre-iterations, unrolled iterations, unrolled post-iterations) that either provide data consistency (gradient update) or provide data consistency and regularization. When implemented, the reconstruction process inputs case base data Y and coil sensitivities C to the signal model and outputs image data X. Each iteration provides a gradient update while certain iterations also include a regularization step. During training, the system learns each of the parameters in order to provide an accurate image. Once trained, the parameters are fixed/frozen, and the network is imported or transferred to the medical imaging system where it is used to transform scan data to image data. During training, in conventional operations, this entails learning, for example ak which is roughly the step size for the gradient update. During the iterative process, the reconstruction algorithm does not calculate a final image right away, rather there is a cost function that optimized. The algorithm calculates a gradient for the cost function at each step. When the gradient is zero or near zero the final image is output. This may take multiple iterations, for example, 10, 100, or more. For each gradient update, one important detail is how far to step with the gradient, e.g., the step size. This ($\alpha_k$) is learned during the training process and then fixed. In the embodiments described herein, an additional term Rho ($\rho$)—also labeled as scaling factor—is used to rescale/scale/tune the step size ($\alpha k$) even after training has finished and the network(s) are implemented on sight.

The MRI reconstruction problem may be formulated as a minimization problem. The goal of the optimization is to reconstruct an image set m that best matches the measured data y in the least squares sense. The optimization-based network architecture utilizes data consistency, as exemplified by the gradient update step. Unrolled reconstructions include alternating between a data consistency step and a regularization step based on a neural network. The data consistency is based on cost function of the form: $D=\|Ax-y\|^2$, where y corresponds to the acquired, under-sampled data and A the signal model that relates the target image x with the data. The signal model is typically based on SENSE. Sensitivity encoding (SENSE) is based on the fact that receiver sensitivity generally has an encoding effect complementary to Fourier preparation by linear field gradients. Thus, by using multiple receiver coils in parallel scan time in Fourier imaging can be considerably reduced. The problem of image reconstruction from sensitivity encoded data is formulated in a general fashion and solved for arbitrary coil configurations and k-space sampling patterns.

The signal model may be written as: A=PUC, where P is the projection on the sampled data, U is the Fourier transformation (or inverse Fourier transformation depending on convention) and C the precalculated coil sensitivity maps.

The ingredient for the unrolled deep learning reconstruction is then the gradient: $G=\nabla_x D=A^+(Ax-y)$, that is used to guide the network to consistency with the acquired data. The regularization is performed by a neural network and is a nonlinear mapping: $x'=U(x)$.

Unrolled reconstructions perform fixed step sizes in the opposite direction of the gradient. The step-size may also be configured as a training parameter. In certain configurations, the gradient step may be performed 'with momentum' and be evaluated for an image that is different from the image put into the regularization network. The regularization network U(x) is non-linear and expects a certain dynamic range typically set in the preprocessing of the network. Therefore, the images should not be arbitrarily rescaled.

In embodiments describe herein, the system 100 performs reconstruction using a tunable gradient scaling factor. The regularization network U(x) may perform on a similar level for various input data, while the gradient G varies in size depending on the sampling pattern and potentially the length of the Fourier transformation. The gradient for the SENSE signal model in one-dimension may be represented by (with inverse Fourier convention):

$$G_m = \sum_{l,p \in sampling\ pattern} e^{-2\pi i m p/N} C_{l,m}^* \left( \frac{1}{N} \sum_{n=0}^{N-1} e^{2\pi i n p/N} C_{l,n} x_n - y_{l,p} \right)$$

where N is the Fourier transformation length, p sums over the sampling pattern, l over the receive channels. The gradient is increased for smaller field of view (i.e., smaller N) and for smaller acceleration (i.e., there are more elements in the sampling pattern and the sum—on average—increases). From this equation, a normalization of N/M in front of the gradient may keep the magnitude of the gradient constant on average: N because of the 1/N Fourier normalization term, and 1/M because the first sum is on M terms of the sampling pattern and that on average each term has the same magnitude probability. As the energy in kspace is more concentrated in the low frequencies, this above assumption is relatively correct when the sampling pattern is altered by changing the ipat factor, but it would be incorrect if the sampling pattern is changed by adding/removing center lines or changing the phase resolution.

The reconstruction and other networks, for example for regularization, otherwise may perform as conventionally implemented. Various machine-learned models may be used, such as a neural network or support vector machine. In one embodiment, the machine-learned model includes a convolutional neural network, such as an image-to-image network or U-Net.

Figure 3:
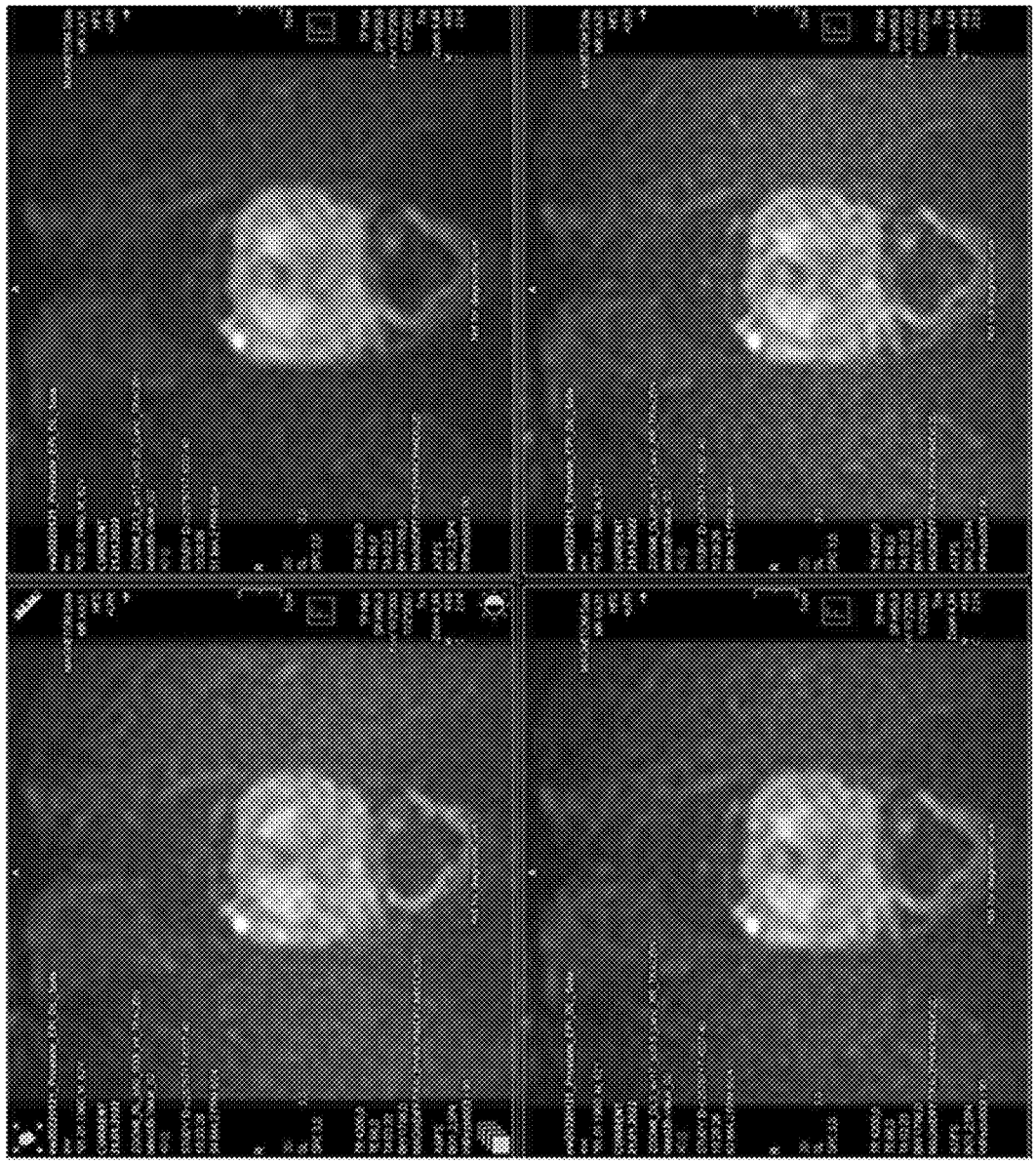
FIG. 3 depicts an example of reconstructed medical images.
Figure 4:
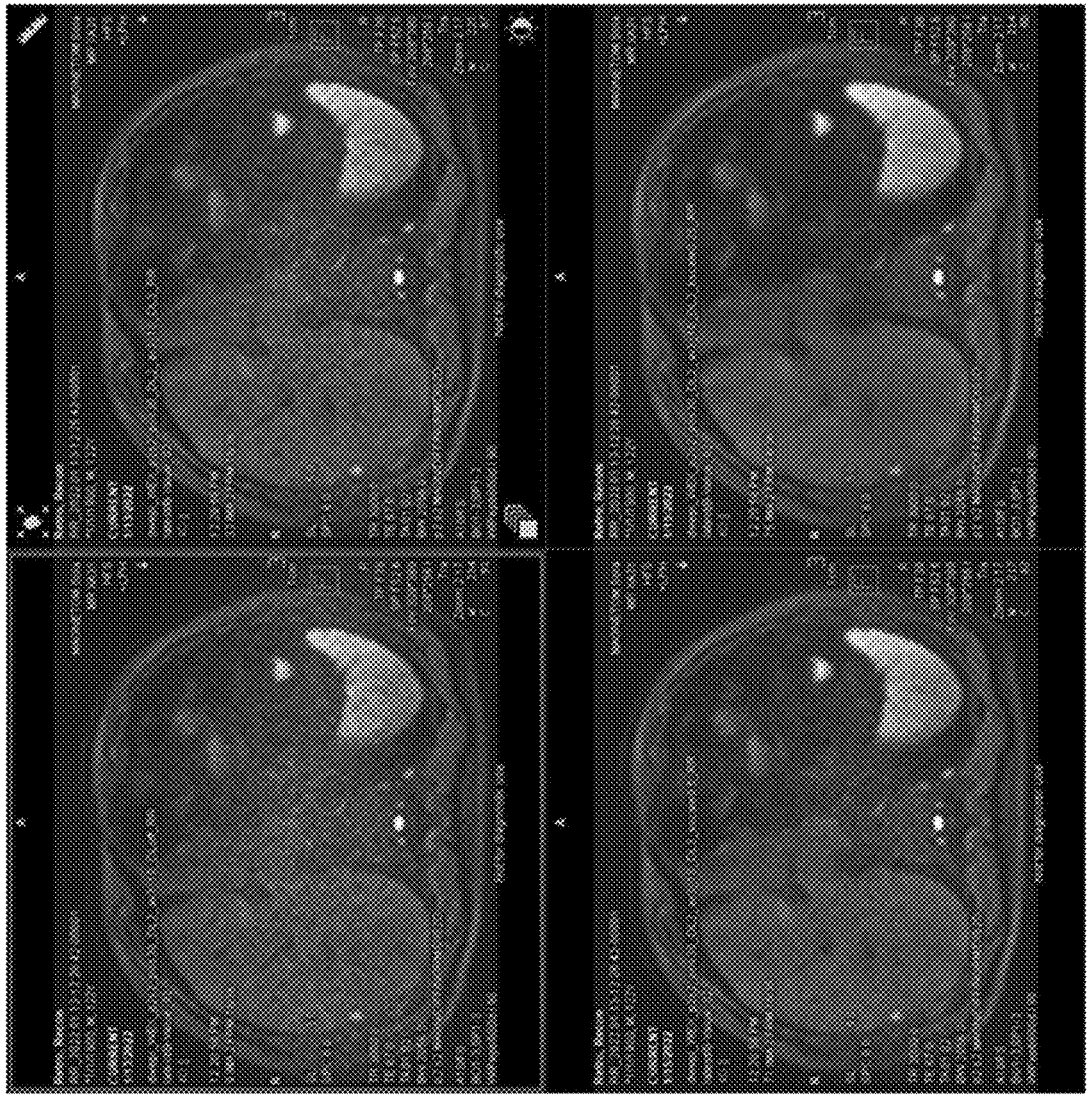
FIG. 4 depicts an example of reconstructed medical images.

FIG. 3 depicts an example of an exemplary application in DWI of the prostate shows the product reconstruction (upper left), and reconstruction with an unrolled iterative reconstruction with a rescaled gradient by a factor of 0.25 (upper right), 0.5 (lower left) and no rescaling. It is apparent that increased denoising is achieved with a rescaled gradient by a factor of 0.25. This may originate from the fact that the acquisition was performed without acceleration while the network training was performed with an acceleration factor of 2 for prostate. FIG. 4 depicts findings for DWI of the liver. The order of the reconstructions is changed: upper left is the product reconstruction, upper right the reconstruction without additional scaling of the gradient, lower left with an additional scaling by 0.5 and lower left with an additional scaling by 0.25. It is apparent that the denoising increased with decreased scaling.

Embodiments provide a scaling factor that provides a heuristic, overall rescaling of gradients. In an example, gradients are decreased to put less weight on data consistency and more weight on denoising. Increasing the gradients also mitigates the risk that the iterative optimization diverges. The use of the scaling factor allows an operator to better control their desired output without having to train multiple or additional networks in order to provide specific outputs.

Embodiments further relate to how the scaling factor is determined. For example, in relation to the following data consistency term:

$$D = \frac{1}{\sigma^2} \|Ax - y\|^2,$$

where σ is the standard deviation of the thermal noise. This is an accurate representation for the noise characteristics of MR data and is measured on modern MR scanners in adjustments steps (and therefore available for considered datasets). The use of the scaling factor allows for a Bayesian motivation of unrolled networks and to consider the gradient step as the gradient of the logarithmic Bayesian probability of the image for given data. Therefore, the step size may vary with $$\frac{1}{\sigma^2},$$

which can be considered during the training process. This also provides a natural insertion of the noise level of the acquired k-space data. Additional factors can influence the weighting of the data-consistency, such as the sampling pattern, the level of noise, etc. Each of these may be used when determining the scaling factor. In an embodiment, one or more relevant inputs such as the ipat factor, phase resolution, phase oversampling, noise std, partial Fourier factor, b-value that may influence the scaling of the data-consistency may be used to identify or determine the scaling factor. These inputs may be input into a neural network (or model), for example a multilayer layer perceptron (MLP), in order to infer the gradient scaling factor. The weights of the network may be trained end to end with the reconstruction network. This model may be used alongside of the reconstruction algorithm to either select and automatically select and determine the scaling factor or to provide possible selections for a user to select from.

When implemented, the image processor is configured to input the raw data from the scanner and a scaling factor. The image processor is configured to output a representation of the object or region from which the raw data was acquired. Additional inputs may be specified such as an acceleration factor and other scanning parameters. The scaling factor may be calculated automatically by the image processor based on the scan type and/or scan parameters. As an example, the scaling factor may be related to the acceleration factor. A model or network may be used to generate one or more scaling factors based on the scan parameters. Alternatively, or additionally, the scaling factor may be selected or determined by an operator. In an embodiment, an operator may select from different scaling factors thus allowing the operator to specify a particular level or denoising. The output representation by the image processor may be a complex or real image. The output image represents the patient (i.e., a reconstructed representation). The image processor may be configured to generate an MR image from the representation. Where the representation is of an area, the values of the representation may be mapped to display values (e.g., scalar values to display color values) and/or formatted for display (e.g., interpolated to a display pixel grid). Alternatively, the output representation is of display values in the display format. Where the representation is of a volume, the image processor performs volume or surface rendering to render a two-dimensional image from the voxels of the volume. This two-dimensional image may be mapped and/or formatted for display as an MR image. Any MR image generation may be used so that the image represents the measured MR response from the patient. The image represents a region of the patient.

FIG. 5 is a flow chart diagram of one embodiment of a method for reconstruction of a medical image in a medical imaging system, such as reconstruction of a MR image in an MR system. During application to one or more different patients and corresponding different scan data, the learned weights or values of the reconstruction network(s) are used except for the scaling factor input which may be provided at runtime after the networks have been trained and implemented. The network and values for the learnable parameters are not changed from one patient to the next, at least over a given time (e.g., weeks, months, or years) or given number of uses (e.g., tens or hundreds). These fixed values and corresponding fixed model are applied sequentially and/or by different processors to scan data for different patients. The network may be updated, such as retrained, or replaced but does not learn new values as part of application for a given patient. The scaling factor, however, may be adjusted for each individual patient or scan. This ability to tune the scaling factor after the network has been trained and the learnable parameters fixed means that an operator may be provided with variable denoising without using additional or specialized networks. The method is performed by the system of FIG. 1 or another system and may use the unrolled reconstruction algorithm of FIG. 2 or other reconstruction algorithm. The medical scanner scans the patient. A scaling factor is determined. A representation is reconstructed using a previously trained reconstruction network that is configured with the scaling factor. The representation may be a medical image, A display displays the medical image. Other components may be used, such as a remote server or a workstation performing the acquisition of the scan data, the reconstruction, and/or the display.

The method is performed in the order shown or other orders. Additional, different, or fewer acts may be provided. For example, a preset, default, or user input settings are used to configure the scanning act 510. As an example, an acceleration factor may be selected by an operator. The acceleration factor may provide a quicker scan and reconstruction but may lead to sparse data and increased SNR. As another example, the scaling factor may be determined automatically as part of the scanning process, for example based on the scanning parameters, or may be a preset option when selecting the scan settings. As another example, the image is stored in a memory (e.g., computerized patient medical record) or transmitted over a computer network instead of or in addition to the display of act 230.

In act 510, the medical imaging system scans a patient. The scan is guided by a protocol, such data acquisition with regular or irregular under sampling or another protocol. The pulse or scan sequence scans the region of the patient, resulting in scan data for a single imaging appointment. In an MR example, a pulse sequence is created based on the configuration of the MR scanner (e.g., the imaging protocol selected). The pulse sequence is transmitted from coils into the patient. The resulting responses are measured by receiving radio frequency signals at the same or different coils. The scanning results in k-space measurements as the scan data.

In act 520, the image processor determines a scaling factor to vary denoising behavior for a trained reconstruction network. In an embodiment, the scaling factor relates to a gradient update parameter. In an embodiment, the scaling factor is determined based on a sampling pattern or a level of noise in the scan data. In an embodiment, the scaling factor is determined by a machine learnt network trained using inputs including at least one of an ipat factor, a phase resolution, a phase oversampling, a noise std, a partial Fourier factor, or a b-value. The machine learnt network may be trained end to end with the reconstruction network.

In image reconstruction algorithms, data consistency in k-space is one of the most critical constraints. A gradient descent step is used for the measurement consistency term. The step size is a parameter that may be learned during training or configuration of the reconstruction algorithm. The training of the reconstruction algorithm may take place at any point prior to the scanning of the patient. During training, the reconstruction algorithm learns parameters using a supervised training process and labeled training data. The result is a reconstruction algorithm with fixed parameters that may then be implemented at the medical imaging system. The scaling factor is used to tune the trained reconstruction algorithm in order to provide variable denoising.

The value or selection of the scaling factor may be automatically determined or may be received from an interface and/or a user input device. For example, a user, facility, or default setting for the level is received as an input from memory. An initial value may be loaded or provided as the input. As another example, a user enters the level, such as through selection along a scale, entry of a value, depression of a button, or rotation of a control knob. The value may be altered, such as receiving the user-selected level of denoising as an adjustment to tune the output or displayed image based on a previous value of the user-selected level of denoising. A level of the characteristics, such as denoising, may be received and used to set the scaling factor. The input is a value within a range. For example, the input is for a continuous variable in the range of [0,1]. Other ranges may be used. The extremes of the range represent the available extremes of denoising, such as 0 being smoothest (less noise) and 1 being noisiest (most noise). Non-continuous variables may be used.

In act 530, an image processor reconstructs a representation of the patient from the scan data using at least the scaling factor. An object (e.g., anatomy) of the patient is reconstructed. The image processor reconstructs a representation or reconstruction from the scan data of the scan. The reconstructing includes calculating a gradient using the scaling factor and regularizing. For MR reconstruction, the k-space data is Fourier transformed into scalar values representing different spatial locations, such as spatial locations representing a plane through or volume of a region in the patient. Scalar pixel or voxel values are reconstructed as the MR image or object. The spatial distribution of measurements in object or image space is formed. This spatial distribution represents the object of the patient.

Various inputs for reconstruction may be used. The scan data is input, such as inputting under-sampled multi-coil k-space data. Coil sensitivity maps and/or an input coil bias field correction map may be input. The scaling factor determined at act 210 is used to adjust the data consistency term and thus affect the level of denoising. The reconstruction is performed using any of various techniques. For example, an optimization is performed to fit the scan data to an estimated representation, such as GRAPPA or other reconstruction algorithm. In other embodiments, the reconstruction uses, at least in part, a machine-learned model, such as a neural network trained with deep machine learning. The machine-learned model is previously trained, and then used as trained in reconstruction. Fixed values of learned parameters are used for application.

In one embodiment, the machine-learned model is trained to receive input of the scan data and to output the reconstruction. In other embodiments, the machine-learned model is used in the reconstruction process, such as for applying a Fourier or inverse Fourier transform, determining a gradient, and/or regularization. Optimization is iteratively performed with the machine-learned model contributing to an act or acts (i.e., stages) in each or some of the iterations.

Any of various machine-learned models may be used, such as a neural network or support vector machine. In certain embodiments, the machine-learned model is part of an unrolled iterative reconstruction. For example, the machine-learned model implements a regularization function in the unrolled iterative reconstruction. An unrolled proximal gradient algorithm with Nesterov momentum includes a convolutional neural network (CNN) for regularization. To produce sharp reconstructions from input undersampled (compressed sensing) multi-coil (parallel imaging) k-space data, the network is first trained to minimize a combined L1 and a multi-scale version of the structural similarity (SSIM) content losses between network prediction and ground truth images for regularization. Other losses may be used, such as using just the L1 loss. The same or different machine-learned model or network (e.g., CNN) is used for each or some of the unrolled iterations. The CNN for regularization may be refined, such as using a semi-supervised refinement applied in a subsequent training step where an adversarial loss is based on Wasserstein Generative Adversarial Networks (WGAN). In another example, the unrolled iterative reconstruction disclosed in U.S. Patent Publication No. US 20220180574A1 (patent application Ser. No. 17/303,790, filed Jan. 1, 2021) is used.

The learnable parameters of the architecture of the reconstruction network are trained for altering the characteristic or characteristics, such as for denoising (removing or reducing noise). In the compressed sensing embodiment, the ground truth representation for training may be reconstructions formed from full sampling, so having reduced noise. Other ground truth representations may be used, such as generated by simulation or application of a denoising or other characteristic altering algorithm.

The training data includes many sets of data, such as representations output by reconstruction and the corresponding ground truth. Tens, hundreds, or thousands of samples are acquired, such as from scans of volunteers or patients, scans of phantoms, simulation of scanning, and/or by image processing to create further samples. Many examples that may result from different scan settings, patient anatomy, scanner characteristics, or other variance that results in different samples are used. In one embodiment, an already gathered or created MR dataset is used for the training data. The samples are used in machine learning (e.g., deep learning) to determine the values of the learnable variables (e.g., values for convolution kernels) that produce outputs with minimized cost or loss across the variance of the different samples.

A computer (e.g., image processor) machine trains the reconstruction network. For example, the reconstruction network is machine trained using training data. In one embodiment, deep learning is used. The training learns both the features of the input data and the conversion of those features to the desired output. Backpropagation, RMSprop, ADAM, or another optimization is used in learning the values of the learnable parameters of the network (e.g., the convolutional neural network (CNN) or fully connection network (FCN)). Where the training is supervised, the differences (e.g., L1, L2, mean square error, or other loss) between the estimated output and the ground truth output are minimized.

Any architecture or layer structure for machine learning to perform an operation for separately reconstructing from subsets may be used. For example, any of the architectures may be used. The architecture defines the structure, learnable parameters, and relationships between parameters. In one embodiment, a convolutional or another neural network is used. Any number of layers and nodes within layers may be used. A DenseNet, U-Net, encoder-decoder, Deep Iterative Down-Up CNN, image-to-image and/or another network may be used. Some of the network may include dense blocks (i.e., multiple layers in sequence outputting to the next layer as well as the final layer in the dense block). Any now known or later developed neural network may be used. Any number of hidden layers may be provided between the input layer and output layer.

Machine learning is an offline training phase where the goal is to identify an optimal set of values of learnable parameters of the model that can be applied to many different inputs. These machine-learned parameters can subsequently be used during clinical operation. Once learned, the machine-learned model is used in an online processing phase in which a reconstruction for a given patient is provided using a determined scaling factor that, for example, adjusts the step size of the gradient update and allows for tuning of the denoising level of the reconstruction. In an embodiment, a scaling factor may further be implemented during the training of the reconstruction networks. For certain networks, the data consistency term may be represented by:

$$D = \frac{1}{\sigma^2}\|Ax - y\|^2,$$

where $\sigma$ is the standard deviation of the thermal noise. This is an accurate assumption for the noise characteristics of MR data and is measured on modern MR scanners in adjustments steps (and therefore available for considered datasets). This allows for a Bayesian motivation of unrolled networks and to consider the gradient step as the gradient of the logarithmic Bayesian probability of the image for given data. Therefore, the step size may vary with $$\frac{1}{\sigma^2},$$

which can be considered in the training.

The reconstruction may output the representation as pixels, voxels, and/or a display formatted image in response to the input. The learned values and network architecture, with any algorithms (e.g., extrapolation and gradient update) determine the output from the input. The output of the reconstruction, such the output of the machine-learned model, is a two-dimensional distribution of pixels representing an area of the patient and/or a three-dimensional distribution of voxels representing a volume of the patient. The output from the last reconstruction iteration may be used as the output representation of the patient.

Other processing may be performed on the input k-space measurements before input. Other processing may be performed on the output representation or reconstruction, such as spatial filtering, color mapping, and/or display formatting. In one embodiment, the machine-learned network outputs voxels or scalar values for a volume spatial distribution as the medical image. Volume rendering is performed to generate a display image. In alternative embodiments, the machine-learned network outputs the display image directly in response to the input.

In act 540 of FIG. 5, the image processor generates and displays an image of the object from the output representation. The image has a level of level of noise relative to sharpness based on the user-selected level (e.g., of denoising). The resulting representation or image is then rendered to a two-dimensional display. A display (e.g., display screen or device) displays the medical image, such as the MR image. The medical image, after or as part of any post processing, is formatted for display on the display. The display presents the image for viewing by the user, radiologist, physician, clinician, and/or patient. The image assists in diagnosis, prognosis, and/or therapy.

The displayed image may represent a planar region or area in the patient. Alternatively, or additionally, the displayed image is a volume or surface rendering from voxels (three-dimensional distribution) to the two-dimensional display.

Embodiments of the method of FIG. 5 provide editable denoising of already trained unrolled networks, insertion of noise level into neural networks for better generalization, and better generalization of the network to multiple sampling patterns and particularly multiple acceleration factors.

Although the subject matter has been described in terms of exemplary embodiments, it is not limited thereto. Rather, the appended claims should be construed broadly, to include other variants and embodiments, which can be made by those skilled in the art.

The invention claimed is:

1. A method of reconstruction for a medical imaging system, the method comprising:
scanning a patient by the medical imaging system, the scanning acquiring scan data;
determining a scaling factor to vary denoising behavior for a trained reconstruction network, wherein the scaling factor adjusts a gradient step size of the trained reconstruction network, wherein the scaling factor is determined by a machine learnt network trained using inputs including at least one of an ipat factor, a phase resolution, a phase oversampling, a noise std, a partial Fourier factor, or a b-value, wherein the machine learnt network is trained end to end with the trained reconstruction network;
reconstructing, by the trained reconstruction network using the scaling factor, an object of the patient from the scan data; and
displaying an image of the reconstructed object.

2. The method of claim 1, wherein scanning comprises magnetic resonance scanning pursuant to a protocol for data acquisition with regular or irregular undersampling.

3. The method of claim 1, wherein the scaling factor is further determined based on a sampling pattern.

4. The method of claim 1, wherein the scaling factor is further determined based on a level of noise in the scan data.

5. The method of claim 1, wherein determining the scaling factor further comprises receiving a desired denoising level from an operator; wherein the scaling factor is determined from the desired denoising level.

6. The method of claim 1, wherein reconstructing comprises reconstructing with an unrolled iterative reconstruction.

7. The method of claim 1, wherein reconstructing comprises an alternation between a data consistency step and a regularization step; wherein the scaling factor is applied in each data consistency step.

8. The method of claim 1, wherein the reconstruction network is trained prior to scanning the patient and the parameters of the reconstruction network are fixed.

9. A medical imaging system, the medical imaging system comprising:
a medical scanner configured to scan a region of a patient, the scan providing scan data;
an input to receive a scaling factor, wherein the scaling factor adjusts a gradient step size of a trained reconstruction network, wherein the scaling factor is determined by a machine learnt network trained using inputs including at least one of an ipat factor, a phase resolution, a phase oversampling, a noise std, a partial Fourier factor, or a b-value, wherein the machine learnt network is trained end to end with the trained reconstruction network;
an image processor configured to reconstruct a representation of the region of the patient using the trained reconstruction network that is adjusted with the scaling factor; and
a display configured to display an image of the region based on the representation.

10. The medical imaging system of claim 9, wherein the medical scanner comprises a magnetic resonance scanner.

11. The medical imaging system of claim 9, wherein the scaling factor is further based on a sampling pattern for the scan.

12. The medical imaging system of claim 9, wherein the scaling factor is further based on a level of noise in the scan data.

13. The medical imaging system of claim 9, wherein the scaling factor is further determined by a machine learnt network trained using one or more parameters from the scan, wherein the machine learnt network is trained end to end with the reconstruction network.

14. The medical imaging system of claim 9, wherein the image processor is configured to reconstruct the representation using an unrolled iterative reconstruction that comprises an alternation between a data consistency step and a regularization step; wherein the scaling factor is applied in each data consistency step.

15. A non-transitory computer readable storage medium comprising a set of computer-readable instructions stored thereon which, when executed by at least one processor cause the processor to:
acquire scan data from a medical imaging scan;
determine a scaling factor for adjusting a gradient step size for a trained reconstruction algorithm, wherein the scaling factor is determined by a machine learnt network trained using inputs including at least one of an ipat factor, a phase resolution, a phase oversampling, a noise std, a partial Fourier factor, or a b-value, wherein the machine learnt network is trained end to end with the trained reconstruction algorithm;
adjust the trained reconstruction algorithm using the scaling factor;
generate an image from the scan data using the adjusted trained reconstruction algorithm; and
display the image.

16. The non-transitory computer readable storage medium of claim 15, wherein the scaling factor is further determined based on a sampling pattern for the medical imaging scan.

17. The non-transitory computer readable storage medium of claim 15, wherein the scaling factor is further determined based on a level of noise in the scan data.

* * * * *